UNITED STATES PATENT OFFICE.

ERNST PREISWERK, OF BASEL, SWITZERLAND, ASSIGNOR TO THE HOFFMANN-LA ROCHE CHEMICAL WORKS, OF NEW YORK, N. Y., A CORPORATION OF NEW YORK.

ISOBUTYL ESTER OF OLEIC ACID.

1,318,461.     Specification of Letters Patent.     Patented Oct. 14, 1919.

No Drawing.     Application filed August 16, 1918. Serial No. 250,193.

*To all whom it may concern:*

Be it known that I, ERNST PREISWERK, a citizen of Switzerland, and a resident of Basel, Switzerland, have invented a new and useful Isobutyl Ester of Oleic Acid, of which the following is a specification.

My invention relates to a new chemical product, to wit: isobutyl ester of oleic acid which may be produced by transforming oleic acid according to usual esterification methods to the isobutyl ester. The isobutyl ester of oleic acid has heretofore been unknown. This body possesses quite extraordinary healing properties in cases of tuberculous diseases. It is a clear fluid with a slightly oily odor, boils at a pressure of 4 m. m. and 190° C. and mixes with the usual organic solvents in every proportion desired. The ester is insoluble in water; its specific weight at 20° C. is .86.

The isobutyl ester of oleic acid is intended to be used for therapeutic purposes.

Example 1.

Equal parts of oleic acid chlorid (*Berichte der deutschen chemischen Gesellschaft* 33, 1900, pages 83–84) and isobutyl alcohol are mixed and shaken till all signs of heating have disappeared. The resulting product is poured into water and washed with fresh water as long as it shows any reaction upon litmus. For the purpose of further purifying the product it is distilled at reduced pressure.

Example 2.

1 part of oleic acid and 2 parts of isobutyl alcohol are heated in a suitable vessel to 85–90° C. A strong current of dry hydrochloric acid gas in then made to pass through. When complete esterification has taken place the product is poured into water and an equal part of ester added. The etheric solution is washed with water till the acid reaction has quite disappeared, then the excess of isobutyl alcohol is removed by distillation. An ester, perfectly free of chlorin, may be obtained by distilling under reduced pressure.

Example 3.

1 part of oleic acid and 2 parts of isobutyl alcohol are heated together with one part of zinc chlorid during an hour to 100° C. The resulting product is purified as indicated in example 1.

The isobutyl ester of oleic acid is applied for therapeutical purposes by injecting the same in doses up to one cubic centimeter.

I claim:

As a new article of manufacture the isobutyl ester of oleic acid which is a clear fluid with a slightly oily odor, boils at a pressure of 4 m. m. and 190° C., mixes with the usual organic solvents in every proportion desired, is insoluble in water and has a specific weight of .86 at 20° C.

In witness whereof I have hereunto set my hand.

ERNST PREISWERK.

Witnesses:
   ALB. A. HOFFMANN,
   HEINRICH KUBLI.